Figure 1:
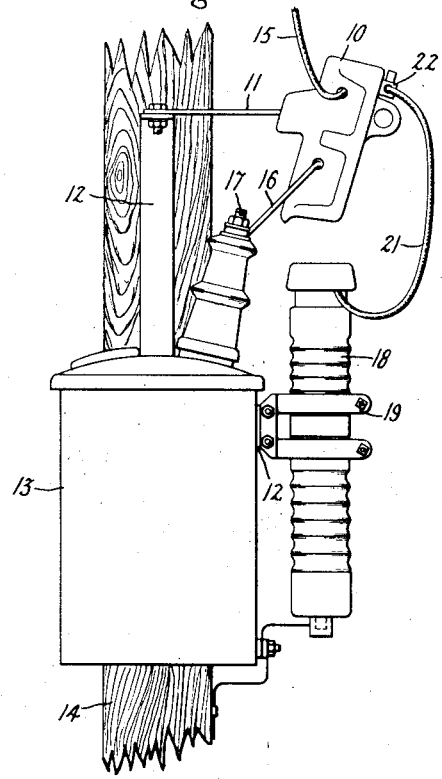

Sept. 8, 1942.   B. R. HERMANN   2,295,343
ELECTRIC CUTOUT
Filed March 25, 1941

Inventor:
Benjamin R. Hermann,
by Harry E. Dunham
His Attorney.

Patented Sept. 8, 1942

2,295,343

UNITED STATES PATENT OFFICE 2,295,343

ELECTRIC CUTOUT

Benjamin R. Hermann, Lanesborough, Mass., assignor to General Electric Company, a corporation of New York Application March 25, 1941, Serial No. 385,067

9 Claims. (Cl. 200—114)

This invention relates to an electric cutout and more particularly to an electric cutout suitable for controlling a plurality of circuits and having an expulsion fuse in one of the circuits.

In certain installations such as those of distribution transformers, a primary cutout is usually provided which includes an automatic circuit interrupter such as an expulsion fuse. The cutout is also manually operable for use as a disconnect switch whereby the transformer may be isolated from the line as during servicing operations. Such installations also usually include a lightning arrester or protective gap which may be mounted adjacent to or upon the transformer itself, in which cases it is also desirable to provide a switch for isolating the lightning arrester in order that it will not constitute a hazard to the lineman while servicing the transformer. It will be kept in mind that it is not practical to arrange the fuse in the circuit ahead of the lightning arrester for in such an arrangement the fuse would be blown by lightning discharges. It is preferred that the lightning arrester isolating switch be combined with the primary cutout so that the single operation of opening of the cutout will simultaneously isolate the lightning arrester from the line. One form of such a combined primary cutout and lightning arrester isolating switch is disclosed in the copending patent application Serial No. 385,071, filed March 25, 1941, by Harold M. Towne, and assigned to the General Electric Company, the assignee of the present application. It is an object of the present invention to provide an improved form of cutout arrangement of the general type disclosed in the above-mentioned application.

More specifically, it is an object of the present invention to provide a new and improved electric cutout of the type having a current responsive interrupter included in one circuit, and other means for controlling an auxiliary circuit.

It is a further object of the present invention to provide a simple and relatively inexpensive arrangement for modifying an electric cutout of an existing form so that it may be made to perform the double function of a cutout for one circuit and an isolating switch for an auxiliary circuit.

In accordance with one form of the invention, an auxiliary circuit terminal is provided on the outer surface of the electric cutout cover. This terminal is connected to a portion of the fuse device mounted on the inner side of the cover which portion is adapted to engage with the line contact. A lightning arrester is connected by a flexible lead to the auxiliary terminal provided on the cutout cover so as not to interfere with the normal operation of the cutout. Thus by opening the cutout cover, both a transformer which may be connected to the line through the fuse and the lightning arrester will be isolated from the line.

For a consideration of what I believe to be novel and my invention, attention is directed to the following description taken in connection with the accompanying drawing while the features of novelty of the invention will be pointed out with greater particularity in the claims appended hereto.

Figure 2:
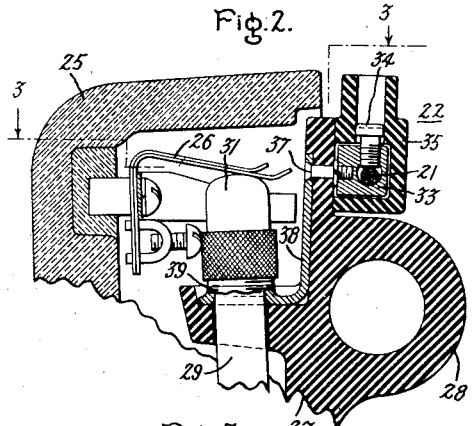
Figure 3:
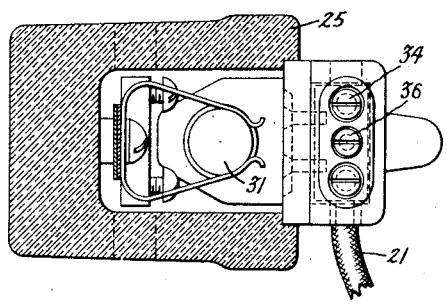
Figure 4:
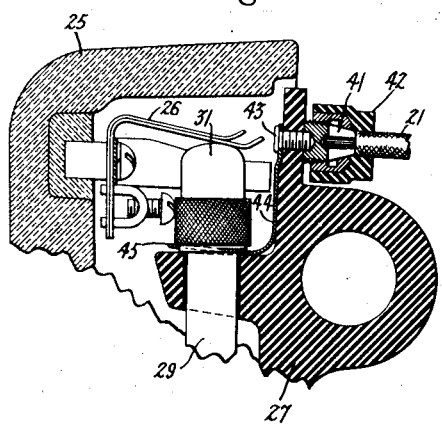
Figure 5:
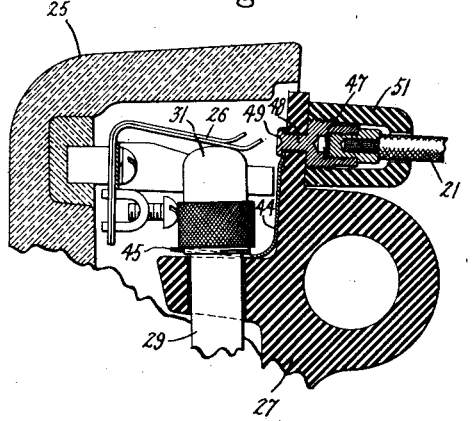

In the drawing, Fig. 1 is a view illustrating a typical installation for an electric cutout of my present invention; Fig. 2 is a fragmentary cross-sectional view of an electric cutout illustrating in greater detail one form of the present invention; Fig. 3 is a cross-sectional view of the cutout arrangement shown in Fig. 2 taken along the line 3—3; and Figs. 4 and 5 are other fragmentary views of electric cutouts illustrating further modifications of the invention.

The cutout of my invention will be described with particular reference to its use in connection with an installation including a transformer and a lightning arrester. It will be obvious, however, that the circuit interrupting device to be described is not to be limited to this particular type of service but other uses will readily occur to one skilled in the art.

In the installation shown in Fig. 1 an electric cutout 10 is supported upon the end of an arm 11 which in turn is secured to the bracket 12 provided for mounting a transformer 13 upon a pole 14. A line conductor 15 is connected to an upper contact of the cutout while a lead 16 connects a lower contact of the cutout 10 to the transformer primary terminal 17. A lightning arrester 18 which is secured by clamps 19 to the transformer bracket 12 is connected by a flexible conductor 21 to an independent auxiliary terminal 22 provided on the cover of the cutout 10.

The electric cutout 10 comprises an insulating casing 25 having an upper or line contact 26 secured therein. The cutout is also provided with an insulating cover 27 having an operating handle 28 on its outer surface and upon the inner surface of which cover is mounted an automatic circuit interrupting device, such as an expulsion fuse 29 having a conductive terminal cap 31 which is adapted to be moved into engagement with the spring fingers of the line contact 26.

The auxiliary terminal 22 comprises a metal connector part 33 drilled lengthwise for cooperatively receiving the bare end of the lead 21. The end of the lead 21 is secured within the connector by a pair of screws 34. The terminal assembly also includes a suitable insulating covering 35 for the connector part 33 which is secured thereto by a screw 36. The terminal assembly described is secured to the outer surface and across the upper end of the cutout cover 27 by a pair of screws 37 which connect the auxiliary terminal to conductor 38 which in turn is connected to the fuse terminal 31. As illustrated, the conductor 38 may be an integral extension from the upper metal ferrule 39 of the fuse device 29. It will be obvious, however, that any other suitable means may be provided for connecting the auxiliary terminal to the terminal cap of the fuse device.

The auxiliary terminal arrangement shown in Fig. 4 comprises a jaw chuck type of connector 41 for clamping onto the bare end of the flexible conductor 21. The connector is covered by an insulating sleeve 42. The connector 41 is secured to the cover by means of a screw 43 which also provides an electrical connection between it and the conductor 44. The conductor 44 in this instance is in the form of a spring strip having an upwardly bent outer end 45 which makes connection with the terminal cap 31 of the fuse device 29.

In the arrangement shown in Fig. 5, the lead 21 is secured to the cutout by a well known form of screw type connector 47 which is provided with a stud 48 extending through the cover 27, the outer end of which stud is spun over the end of the conductor strip 44 as indicated at 49. The connector 47 is covered by a suitable insulating shell 51.

Having described my invention in what I consider to represent preferred embodiments thereof, I desire to have it understood that the specific forms shown are merely illustrative and that the invention may be carried out by other means.

What I claim as new and desire to secure by Letters Patent of the United States is:

1. An electric cutout comprising an insulating casing, a line contact mounted in said casing, a cover for said casing, a fuse mounted on the inner surface of said cover and movable therewith, said fuse having a terminal end cap adapted to be moved into engagement with said line contact, an auxiliary circuit terminal independent of said fuse mounted on said cover, and means conductively connecting said terminal with said fuse end cap.

2. An electric cutout comprising an insulating casing, a line contact mounted in said casing, a cover for said casing, an automatic circuit interrupting device mounted on said cover and having a terminal movable into engagement with said line contact, an auxiliary terminal independent of said fuse mounted on said cover, and means conductively connecting said auxiliary terminal to said first mentioned terminal.

3. An electric cutout comprising an insulating casing, a line contact mounted in said casing, a cover for said casing, an expulsion fuse mounted on said cover and having a terminal end cap movable into engagement with said line contact, a conductor electrically connected with said terminal end cap and extending through said cover to a terminal on the outside thereof.

4. An electric cutout comprising an insulating support, a contact mounted on said support, a fuse device mounted on said support and having a terminal movable into engagement with said contact, an independent auxiliary circuit terminal movable with said fuse device and a conductor connecting said auxiliary circuit terminal with said first mentioned terminal.

5. An electric cutout having in combination an insulating support, a line contact mounted on said support, a circuit interrupting device mounted on said support and having a terminal movable into engagement with said contact, and an independent auxiliary circuit terminal movable with said circuit interrupting device and conductively connected to said terminal.

6. In combination with an electric cutout of the type comprising an insulating support having a pair of spaced contacts, a second insulating support mounted on said first support and a fusible circuit interrupting device secured to said second support and movable thereby into an electrically bridging relation with respect to said pair of contacts, an independent auxiliary terminal on said second support and movable into an electrically conductive relation with one of said contacts together with said device.

7. A cover for an electric cutout of the type adapted for carrying a circuit interrupting device into a bridging relation with respect to a pair of spaced contacts mounted within an insulating housing, said cover comprising an insulating member, an independent auxiliary terminal secured on said cover, conductive means secured to said terminal and adapted to be engaged by a terminal of an interrupting element mounted on said cover whereby said auxiliary circuit terminal is connected to one of said contacts in the closed position of said cover.

8. A cover unit for an electric cutout or like device comprising an insulating housing having a pair of spaced contacts mounted therein, said cover unit comprising an insulating member adapted to be attached to said housing, a circuit interrupting element attached to said insulating member and movable therewith into a bridging relation with said spaced contacts, an independent auxiliary terminal mounted on said insulating member and means for conductively connecting said auxiliary terminal to one of said contacts in the closed position of said member.

9. A cover unit for an electric cutout or like device comprising an insulating housing having a pair of spaced contacts mounted therein, said cover unit comprising an insulating member, an electric circuit interrupting device having a pair of terminals mounted on said insulating member, said insulating member being adaptable for movement into a cooperating relation with respect to said housing whereby said terminals are connected to corresponding of said contacts, an independent auxiliary circuit terminal mounted on said insulating member, and means conductively connecting said auxiliary circuit terminal to one of said interrupting device terminals.

BENJAMIN R. HERMANN.